(12) United States Patent
Lequesne (10) Patent No.: US 12,231,003 B2
(45) Date of Patent: Feb. 18, 2025

(54) MAGNETIC CIRCUIT WITH MORE THAN ONE MAGNET TYPE

(71) Applicant: Niron Magnetics, Inc., Minneapolis, MN (US)

(72) Inventor: Bruno P. Lequesne, Menomonee Falls, WI (US)

(73) Assignee: Niron Magnetics, Inc., Minneapolis, MN (US)

( * ) Notice: Subject to any disclaimer, the term of this patent is extended or adjusted under 35 U.S.C. 154(b) by 225 days.

(21) Appl. No.: 17/701,047

(22) Filed: Mar. 22, 2022

(65) Prior Publication Data

US 2023/0307970 A1   Sep. 28, 2023

(51) Int. Cl.
*H02K 1/27* (2022.01)
*H02K 1/02* (2006.01)
*H02K 1/276* (2022.01)

(52) U.S. Cl.
CPC ............ *H02K 1/2766* (2013.01); *H02K 1/02* (2013.01)

(58) Field of Classification Search
CPC ..... H02K 1/2766; H02K 1/02; H02K 2213/03
See application file for complete search history.

(56) References Cited

U.S. PATENT DOCUMENTS

| | | |
|---|---|---|
| 2,691,072 A | 10/1954 | Mathes |
| 3,588,380 A | 6/1971 | Horlander |
| 9,906,083 B2* | 2/2018 | Cao .................. F04D 25/06 |
| 2014/0375160 A1 | 12/2014 | Zhang et al. |
| 2015/0001980 A1 | 1/2015 | Zhang et al. |
| 2015/0016236 A1 | 1/2015 | Showa |
| 2018/0183289 A1* | 6/2018 | Horiuchi .............. H02K 1/279 |
| 2018/0219463 A1* | 8/2018 | Sasaki ................ H02K 21/024 |
| 2020/0119605 A1* | 4/2020 | Kitayama ............ H02K 1/2766 |
| 2020/0321816 A1* | 10/2020 | Watanabe ............ F25B 13/00 |
| 2021/0242736 A1* | 8/2021 | Wang .................. H02K 1/276 |
| 2022/0140680 A1* | 5/2022 | Coppola ............. H02K 1/276 |
| | | 310/61 |

* cited by examiner

*Primary Examiner* — Thomas Truong
(74) *Attorney, Agent, or Firm* — Faegre Drinker Biddle & Reath LLP (57) ABSTRACT

This disclosure provides systems, methods, and apparatus, including: a first magnet with a first remanence value and a first coercivity value, the first magnet having a first cross-sectional area substantially normal to a direction of magnetization of the first magnet; and a second magnet positioned in series with the first magnet, the second magnet with a second remanence value and a second coercivity value that is less than the first coercivity value, the second magnet having a second cross-sectional area substantially normal to a direction of magnetization of the second magnet. A ratio of the first cross-sectional area to the second cross-sectional area is equal to or greater than a ratio of the second remanence value to the first remanence value.

24 Claims, 8 Drawing Sheets

MAGNETIC CIRCUIT WITH MORE THAN ONE MAGNET TYPE

TECHNICAL FIELD

This disclosure relates to the field of magnetic circuits, in particular to permanent magnets used in magnetic circuits.

DESCRIPTION OF THE RELATED TECHNOLOGY

Permanent magnets are widely used in electrical and electromechanical applications. For example, permanent magnets can be used to provide magnetic fields, which can be interacted with by current carrying conductors. The interaction can produce mechanical forces on the conductor and magnet assemblies, which forces can be harnessed for various applications such as, for example, motors.

SUMMARY

In some aspects, the techniques described herein relate to an apparatus, including: a first magnet with a first remanence value and a first coercivity value, the first magnet having a first cross-sectional area substantially normal to a direction of magnetization of the first magnet; and a second magnet positioned in series with the first magnet, the second magnet with a second remanence value and a second coercivity value that is less than the first coercivity value, the second magnet having a second cross-sectional area substantially normal to a direction of magnetization of the second magnet. A ratio of the first cross-sectional area to the second cross-sectional area is equal to or greater than a ratio of the second remanence value to the first remanence value.

In some aspects, the second magnet is positioned in a path of the direction of magnetization of the first magnet. In some aspects, the second remanence value is greater than the first remanence value. In some aspects, an operating point of the second magnet, positioned in a second quadrant of a magnetization (BH) curve associated with the second magnet, is at a magnetic flux density value that is greater than what that value would be for a configuration where the first cross-sectional area is equal to the second cross-sectional area.

In some aspects, the first magnet has a shape that has non-constant cross-sectional areas normal to the direction of magnetization of the first magnet, where the first cross-sectional area is equal to a smallest of the non-constant cross-sectional areas. In some aspects, the second magnet has a shape that has non-constant cross-sectional areas normal to the direction of magnetization of the second magnet, where the second cross-sectional area is equal to a largest of the non-constant cross-sectional areas.

In some aspects, the first magnet has a first curved shape defined by a first curved surface and a second curved surface separated by a thickness of the first magnet, where the direction of magnetization of the first magnet is parallel to one radius of the first curved shape, and where the first cross-sectional area includes an area of a first plane normal to the direction of magnetization of the first magnet. In some aspects, the first plane normal to the direction of magnetization of the first magnet has a smallest area from among a set of planes that are normal to the direction of magnetization of the first magnet.

In some aspects, the first magnet has a first curved shape defined by a first curved surface and a second curved surface separated by a thickness of the first magnet, where the direction of magnetization of the first magnet has multiple directions that extend along the radii of the first curved shape, and where the first cross-sectional area includes an area of a curved surface that is normal to the multiple directions. In some aspects, the curved surface normal to the multiple directions is a curved surface with a smallest area from among a set of curved surfaces that are normal to the multiple directions.

In some aspects, the second magnet has a second curved shape defined by a third curved surface and a fourth curved surface separated by a thickness of the second magnet, where the direction of magnetization of the second magnet is parallel to one radius of the second curved shape, and where the second cross-sectional area includes an area of a second plane normal to the direction of magnetization of the second magnet.

In some aspects, the second plane normal to the direction of magnetization of the second magnet has a largest area from among a set of planes that are normal to the direction of magnetization of the second magnet. In some aspects, the second magnet has a second curved shape defined by a third curved surface and a fourth curved surface separated by a thickness of the second magnet, where the direction of magnetization of the second magnet has multiple directions that extend along the radii of the second curved shape, and where the second cross-sectional area includes an area of a curved surface that is normal to the multiple directions. In some aspects, the curved surface normal to the multiple directions is a curved surface with a largest area from among a set of curved surfaces that are normal to the multiple directions.

In some aspects, the first magnet and the second magnet are separated by a spacer. In some aspects, the spacer includes ferromagnetic material. In some aspects, the spacer has a cross-sectional area that is at least as large as the greater of the first cross-sectional area and the second cross-sectional area. In some aspects, a thickness of the spacer is less than or equal to 3 mm. In some aspects, the apparatus further includes: an electric machine including a stator and a rotor separated from the stator by an air gap, where the first magnet and the second magnet are positioned in series in only one of the stator or the rotor. In some aspects, the first magnet is positioned closer to the air gap than the second magnet. In some aspects, the electric machine includes of a plurality of poles, where at least one pole of the plurality of poles includes the first magnet and the second magnet.

In some aspects, the first magnet is of neodymium-iron-boron type. In some aspects, the first magnet is of samarium-cobalt type. In some aspects, the second magnet includes at least one of iron nitride type.

BRIEF DESCRIPTION OF THE DRAWINGS

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of".

As used herein, the term "and/or" includes any and all combinations of one or more of the associated listed items. Expressions such as "at least one of," when preceding a list of elements, modify the entire list of elements and do not modify the individual elements of the list.

As used in the specification and the appended claims, the singular forms "a," "an" and "the" include plural referents unless the context clearly dictates otherwise. Thus, for example, reference to "a proton beam degrader," "a degrader foil," or "a conduit," includes, but is not limited to, two or more such proton beam degraders, degrader foils, or conduits, and the like.

The various concepts introduced above and discussed in greater detail below may be implemented in any of numerous ways, as the described concepts are not limited to any particular manner of implementation. Examples of specific implementations and applications are provided primarily for illustrative purposes.

As used herein, the terms "optional" or "optionally" means that the subsequently described event or circumstance can or cannot occur, and that the description includes instances where said event or circumstance occurs and instances where it does not.

Permanent magnets are commonly utilized in various devices such as, for example, electric motors, electric generators, electric actuators, where the permanent magnets provide a magnetic field to interact with current carrying conductors or with conductors in motion. Permanent magnets can be characterized, in part, by their remanence ($B_r$) and their coercivity ($H_c$). The remanence of a permanent magnet generally refers to the magnetization of the magnet in the absence of an external magnetic field. The remanence can be measured as the flux density ($B_r$) when the external magnetic field (H) is zero. The coercivity ($H_c$) of a permanent magnet generally refers to a magnitude of external magnetic field that the permanent magnet can withstand without becoming demagnetized. The coercivity can be measured as the magnitude of the external magnetic field when the flux density reduces to zero. It is desirable for a permanent magnet to have high remanence and high coercivity. For example, when permanent magnets are used in electrical machines such as motors, the permanent magnets can encounter magnetic fields generated by other magnets or current carrying conductors. These magnetic fields can have magnitudes that are high enough to permanently demagnetize the permanent magnets. Demagnetized permanent magnets would then have to be replaced—increasing the cost of operation of the electrical machines.

One approach to reducing the risk of demagnetization is to employ permanent magnets that have high coercivity along with high remanence. However, most permanent magnets with both high coercivity and high remanence can be costly, thereby increasing the cost of the electrical machines. Yet, in some instances, relatively cheaper magnets that exhibit high remanence but low coercivity have been employed. While using these magnets lowers costs, the low coercivity of these magnets increases the risk of demagnetization. In another approach, the magnitude of the demagnetizing magnetic fields produced in electrical machines can be reduced. In most instances, the magnitude can be limited by limiting the current flowing through the current carrying conductors. However, limiting the current may also limit the torque produced by the electrical machine. That is, while limiting the magnitude of the demagnetizing magnetic field, on one hand, would reduce the risk of demagnetizing the permanent magnets, the corresponding limitation on the current through the current carrying conductors, on the other hand, would limit the torque produced by the electrical machine. As it is desirable to extract as much torque as possible from the electrical machine, the limitation on the torque produced can be undesirable.

As discussed in detail herein, one approach to reducing the risk of demagnetization without reducing torque production and reducing the costs associated with high remanence and high coercivity permanent magnets is to utilize a plurality of permanent magnets in series. In particular, a first magnet with high coercivity is positioned in series with a second magnet with a coercivity value that is less than that of the first magnet. In addition to being positioned in series, the dimensions of the first magnet and the second magnet are selected such that the flux density in the second magnet is higher with the first magnet in series than it would be without the first magnet. As discussed in detail below, this increase in the flux density of the second magnet shifts an operating point of the second magnet to allow for increased opposing magnetic fields with reduced risk of demagnetization of the second magnet. The increase in the opposing magnetic fields translates into the ability to use increased current in the current carrying conductors—resulting in greater torque.

Figure 1A:
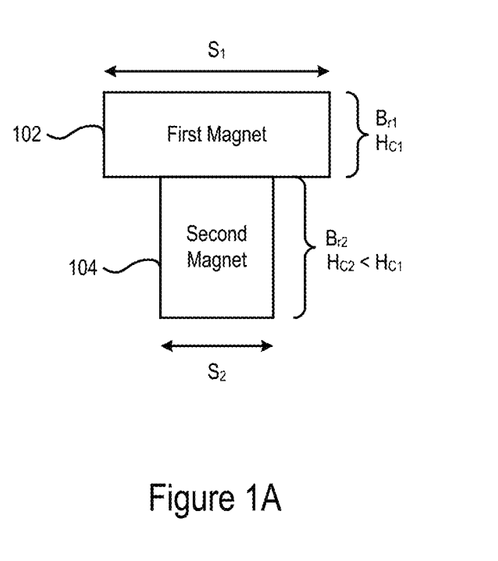
FIGS. 1A and 1B show examples of magnetic apparatuses including two magnets in series.

FIG. 1A shows an example first magnetic apparatus 100 including two magnets in series. In particular, FIG. 1A shows the first magnetic apparatus 100 including a first magnet 102 placed in series with a second magnet 104. The first magnet 102 has a first remanence value $B_{r1}$ and a first coercivity value $H_{c1}$, while the second magnet 104 has a second remanence value $B_{r2}$ and a second coercivity value $H_{c2}$. For the first magnetic apparatus 100, the second coercivity value $H_{c2}$ is less than the first coercivity value $H_{c1}$. The first magnet 102 also has a first cross-sectional area $S_1$ and the second magnet 104 has a second cross-sectional area $S_2$.

Figure 1B:
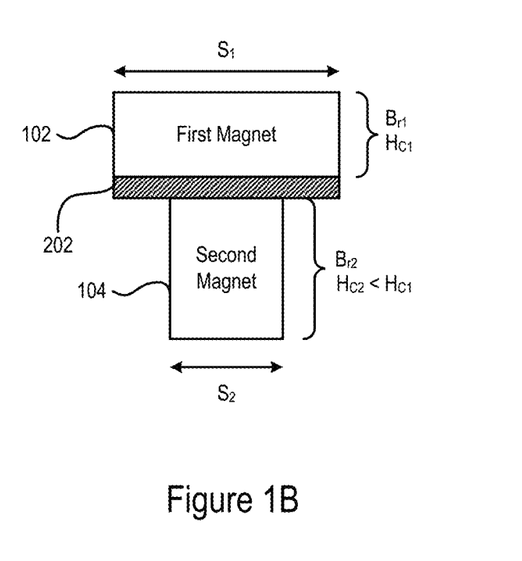

FIG. 1B shows an example second magnetic apparatus 200 including two magnets in series separated by a spacer. In particular, the second magnetic apparatus 200 includes the first magnet 102 and the second magnet 104 separated by a spacer 202. In some examples, the spacer 202 is ferromagnetic. In some examples, the spacer 202 can include ferromagnetic materials such as, for example, iron, steel, cobalt, nickel, neodymium, etc. The spacer 202 can have a cross-sectional area that is at least as large as the greater of the effective cross-sectional area of the first magnet 102 and the effective cross-sectional area of the second magnet 104. For example, as shown in FIG. 1B, the cross-sectional area of the spacer 202 is at least as large as the effective cross-sectional area $S_1$ of first magnet 102, where the cross-sectional area $S_1$ is greater than the cross-sectional area $S_2$ of the second magnet 104. In some examples, the spacer 202 can be positioned such that the perimeter of the spacer 202 is aligned with or extends beyond the perimeter of the first magnet 102. In the example shown in FIG. 1B, the perimeter of the spacer 202 is aligned with the perimeter of the first magnet 102 (or the magnet with the greater surface area), but in other examples, the perimeter could extend beyond the perimeter of the first magnet 102 (or the magnet with the greater surface area). The presence of a spacer 202, particularly a ferromagnetic spacer, helps the magnetic flux as it leaves one of the magnets (for instance, the second magnet), to reorient itself before entering the other magnet (in the same example, the first magnet). Such flux reorientation makes it possible to more fully utilize the entirety of the volumes of the two magnets. It is best achieved, therefore, if the spacer 202 is wider than both magnets, or at least as wide as the wider of the two magnets (instance shown in FIG. 1B). Because the permeability of typical ferromagnetic materials (e.g., steel) is orders of magnitude larger than that of both air and of typical magnet materials, the spacer 202 need not be thick. In fact, it may be that the main constraint in deciding on the spacer thickness is of a mechanical nature, or a matter of manufacturing convenience, rather than magnetic.

In some examples, the spacer can have shape and dimensions such that there is no intentional airgap between the surface of the spacer 202 and the adjacent magnet. For example, the surface of the spacer 202 adjacent to the first magnet 102 can have a shape that conforms to the shape of surface of the first magnet 102 facing the spacer 202. Similarly, the surface of the spacer 202 adjacent to the second magnet 104 can have a shape that conforms to the shape of the surface of the second magnet 104 facing the spacer 202. In some examples, a thickness of the spacer can have a value between 1 mm to 5 mm, or be equal to 3 mm.

Figure 2A:
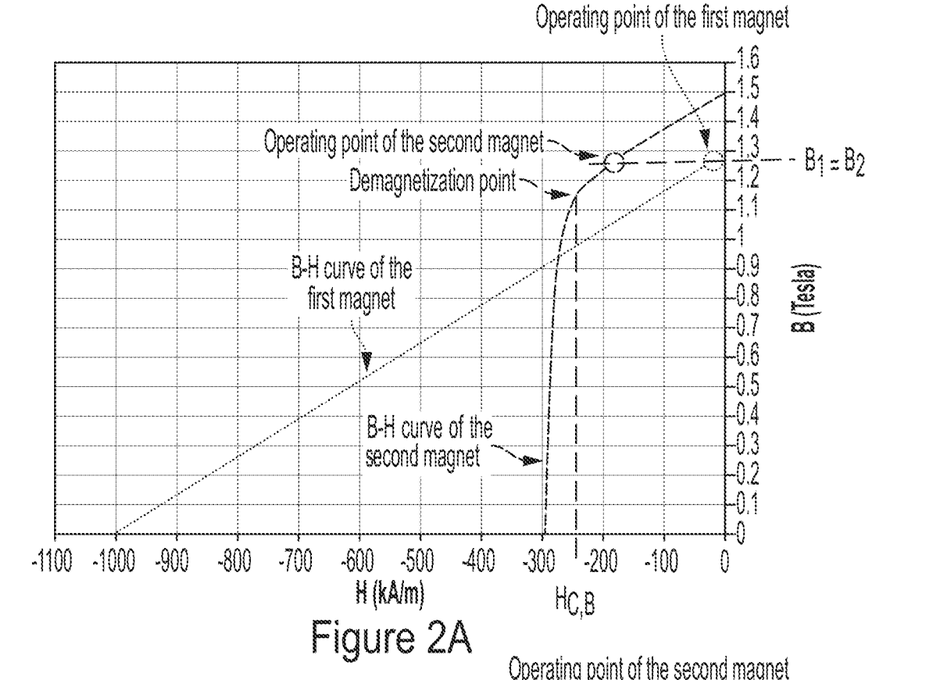
FIGS. 2A and 2B depict example graphs representing magnetization characteristics (also known as B-H curves) of two magnets in series.
Figure 2B:
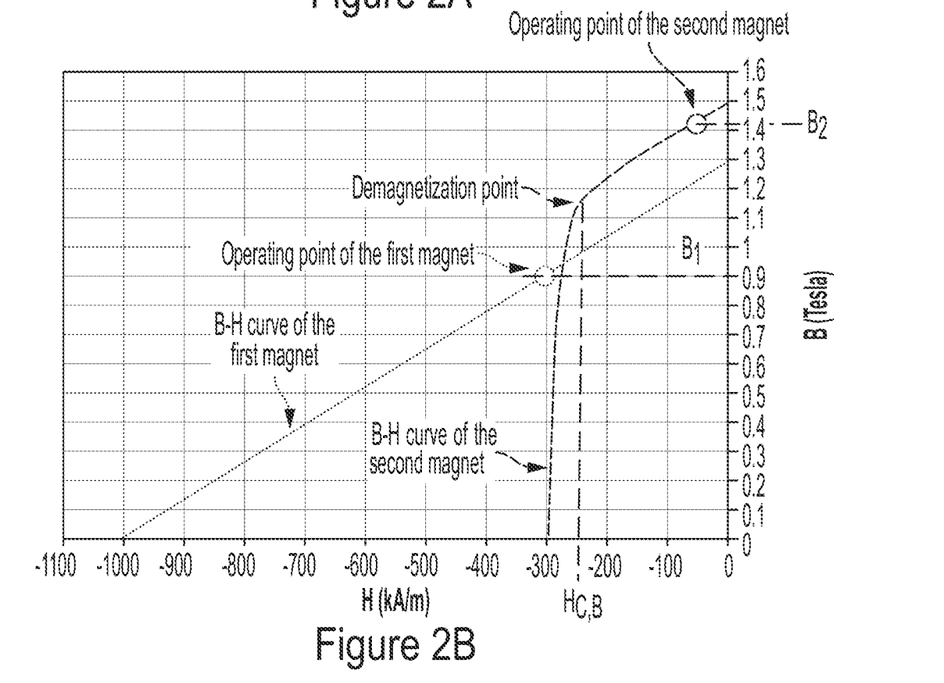

The series combination of the first magnet 102 and the second magnet 104 with the relative dimensions discussed below allow the combination to have a lower risk of demagnetization. In particular, such a series combination shifts the operating point of the magnet with lower coercivity such that the risk of demagnetization of that magnet is reduced. FIGS. 2A and 2B depict example graphs representing B-H characteristics of two magnets in series. The same B-H curves are shown in both FIGS. 2A and 2B, reflecting the same magnet materials being used in both instances for the first and second magnets. The difference between the two figures resides in the operating points of the two magnets. In particular, FIG. 2A depicts a situation where the first magnet 102 and the second magnet 104 have similar effective cross-sectional areas, and FIG. 2B depicts another situation, where the two magnets have unequal effective cross-sectional areas. In particular, the ratio of the effective cross-sectional area of the first magnet 102 to the effective cross-sectional area of the second magnet 104 is equal to or greater than a ratio of the remanence value of the second magnet 104 to the remanence value of the first magnet 102. Referring to FIG. 2A, the x-axis represents the applied magnetic field (H) and the y-axis represents the flux density (B) of the magnets. It should be noted that FIGS. 2A and 2B show a portion (specifically the top-left quadrant) of the B-H curves of the two magnets. Typically, such B-H curves are commonly referred to as hysteresis or magnetization curves. The top-left portion of the B-H curves show the flux density of the magnets in response to opposing magnetic field (indicated by the –ve values on the x-axis) H.

As referenced above, a permanent magnet can be characterized, in part, by its remanence ($B_r$) and its coercivity ($H_c$). Referring to the B-H curve of the second magnet in FIG. 2A, the remanence ($B_r$) of the second magnet 104 can be determined by the value of the flux density B where the value of the magnetic field H is equal to zero. The value of the remanence $B_r$ is indicated by the value of the flux density B where the B-H curve intersects the y-axis. The coercivity ($H_c$) of the second magnet 104 can be determined by the value of the magnetic field H where the flux density B is equal to zero. The value of the coercivity $H_c$ is indicated by the value of the magnetic field H where the B-H curve intersects the x-axis. In the example shown in FIGS. 2A and 2B, the coercivity $H_{c1}$ of the first magnet 102 is greater than the coercivity $H_{c2}$ of the second magnet 104; and the remanence $B_{r1}$ of the first magnet 102 is less than the remanence $B_{r2}$ of the second magnet 104.

The magnets also can be characterized by a demagnetization point (or commonly referred to as "demagnetization knee"), which refers to a point on the B-H curve beyond which the magnetic flux density rolls off rapidly in response to further increase in the magnitude of the opposing magnetic field. Operating the permanent magnet beyond the demagnetization point can increase the risk of demagnetization of the permanent magnet. For example, referring to the B-H curve of the second magnet in FIG. 2A, the B-H curve decreases substantially linearly as a function of increasing magnitude of opposing magnetic field from the point where the B-H curve intersects the y-axis up to the demagnetization point. With further increase in the magnitude of the opposing magnetic field, the B-H curve rolls off non-linearly and rather quickly. Beyond the demagnetization point, the magnet may be irreversibly demagnetized.

It is desirable to design the second magnet 104 such that an operating point of the second magnet 104 does not go below the demagnetization point on the B-H curve. It should be noted that the operating point of a permanent magnet is a point of intersection of the B-H curve and a load line (also known as permeance coefficient line). The operating point indicates the flux density corresponding to the magnitude of the opposing magnetic field. While the operating point is maintained above the demagnetization point on the B-H curve, the operating point can return to the remanence value $B_r$ once the opposing magnetic field is removed. However, if the permanent magnet's operating point goes below the demagnetization point, then after the opposing magnetic field is removed, the operating point may not return to its original remanence value $B_r$. Instead, the operating point would likely return to a value that is less than the original remanence value—indicating irreversible demagnetization of the permanent magnet.

Considering the two magnets 104 and 102 separately (i.e., not in proximity, but inside of a similar magnetic circuit) each magnet will have its operating point on its respective B-H curve. Most likely, with the two magnets having equal effective cross-sections, and being within similar magnetic circuits, the operating point of the second magnet 104 would be at a higher flux density than that of the first magnet 102, because of the stronger remanent flux density of magnet 104. When positioned in series, and again if the two magnets have equal effective cross-sections, however, due to conservation of flux the operating point of the second magnet 104 is "biased down" or pulled further down on the second magnet's B-H curve. This can be seen in FIG. 2A, where the operating points of the first magnet 102 and the second magnet 104 have equal flux densities ($B_1=B_2$). The biasing down of the operating point of the second magnet 104 brings it closer to the demagnetization point, which, as discussed above, increases the risk of permanent demagnetization of the second magnet 104, which has a lower coercivity than the first magnet 102.

To mitigate the risk of demagnetization the relative dimensions of the first magnet 102 and the second magnet 104 can be selected such that the operating point of the second magnet 104 (with the relatively lower coercivity) is biased up away from the demagnetization point. In particular, the ratio of the effective surface area $S_1$ of the first magnet 102 to the effective surface area $S_2$ of the second magnet 104 is greater than or equal to the ratio of the remanence value $B_{r2}$ of the second magnet 104 to the remanence value $B_{r1}$ of the first magnet 102, and can be expressed as:

$$\frac{S_1}{S_2} \geq \frac{B_{r2}}{B_{r1}} \quad (1)$$

Equation (1) suggests that the relative sizes of the magnets in series is a function of the relative remanences of the magnets. In some instances, if the second magnet 104 has a remanence value that is greater than that of the first magnet 102, then the effective cross-sectional area of the second magnet 104 is less than that of the first magnet 102. The extent to which the effective cross-sectional area of the second magnet 104 is less than the effective cross-sectional area of the first magnet 102 is dependent on the ratio of the remanences of the two magnets. FIG. 2B shows an example of the resulting relative positions of the operating points of the second magnet 104. In particular, by ensuring that the effective surface areas of the first magnet 102 and the second magnet 104 satisfy equation (1) above and due to conservation of flux, the operating point of the second magnet 104 is moved further away from the demagnetization point on the B-H curve. As a result, the risk of demagnetization of the second magnet 104 is reduced. Conversely, the operating point of the first magnet is now lower, which is acceptable given the higher coercivity of the first magnet.

As discussed above, presently known permanent magnets with both high coercivity and high remanence values (such as magnets from the neodymium-iron-boron family, or from the samarium-cobalt family) can be costly, limiting or even prohibiting their use in many applications. Other presently known magnets have a high remanence value but a lower coercivity, as well as a relatively lower cost, for instance magnets from the iron-nitride family. By utilizing a series combination of a first magnet 102 that has high coercivity and a second magnet 104 that has relatively lower coercivity, and relatively lower costs, the overall cost of using permanent magnets can be reduced while achieving a desired level of performance in applications. That is, where previously the entire magnet would be made of the costly high coercivity material, in the series combination only a portion of the entire magnetic apparatus is made up of the costly high coercivity material while the remainder of the magnetic apparatus is made of relatively cheaper low coercivity material.

Also discussed above was an approach to mitigate demagnetization by reducing the current in the current carrying conductors that produce the opposing and demagnetizing magnetic fields. That approach impacted the maximum torque produced by the electrical machine. However, by utilizing the series combination of the magnets discussed herein, the current in the current carrying conductors may not be impacted, or at least can be increased, leading to higher torque potential from a given electric machine. For example, referring to FIG. 2B, the "biasing up" of the operating point of the second magnet 104 pushes the operating point of the second magnet 104 away from the demagnetization point. This provides a larger margin, in terms of the magnetic field intensity, to operate the second magnet 104 before risking demagnetization. This larger margin translates into larger current in the current carrying conductors in electrical machines, thereby allowing the electrical machines to generate relatively greater torque before risking irreversible demagnetization.

In describing the first magnetic apparatus 100 and the second magnetic apparatus 200, it was mentioned that the first magnet 102 is placed in series with the second magnet 104. As used herein, positioning the first magnet in series with a second magnet means that the second magnet is positioned in relation to the first magnet such that in a magnetic circuit formed in part by the first magnet and the second magnet, an entirety of magnetic flux of the second magnet traverses at least a portion of the first magnet. The "entirety of magnetic flux" excludes any leakage magnetic flux produced by the second magnet or within the magnetic circuit.

Figure 3A:
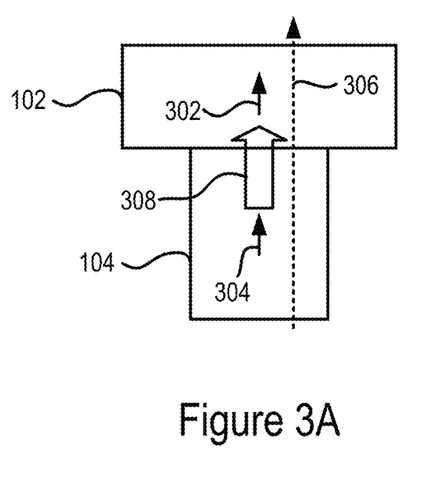
FIGS. 3A-3F show various examples of magnet arrangements that show at least two magnets in series.

FIG. 3A depicts an example series arrangement of two magnets. In particular, FIG. 3A shows a first magnet 102 and a second magnet 104 in series arrangement. The first magnet 102 can have a cylindrical shape, or a rectangular parallelepiped shape, with a constant cross-sectional area along its direction of magnetization. Similarly, the second magnet 104 also can have a cylindrical shape, or a rectangular parallelepiped shape, with a constant cross-sectional area along its direction of magnetization. For the purpose of illustration, the magnets in FIGS. 3B-3H can also have a shape similar to those shown in FIG. 3A, albeit with variation in dimensions. It should be noted, however, that the cylindrical, or rectangular parallelepiped shapes are shown only as examples, and are not limiting on the type of shapes of magnets that can be employed. The first magnet 102 has a first direction of magnetization 302 and the second magnet has a second direction of magnetization 304. The first magnet 102 and second magnet 104 can form, in part, a magnetic circuit 306, which can include one or more closed loop paths containing the magnetic flux generated by the first magnet 102 and the second magnet 104. The magnetic circuit 306 can include additional components such as portion of the rotor or stator, air gap, etc., within which the magnetic flux is contained. The entirety of the magnetic flux 308 of the second magnet 104 traverses at least a portion of the first magnet 102. In some instances, some leakage flux may be generated by the second magnet 104. In the context here, the entirety of magnetic flux 308 does not include that leakage flux.

Figure 3B:
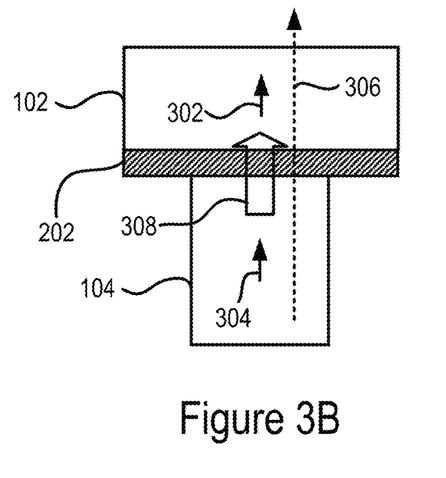

FIG. 3B shows another example arrangement of two magnets. In particular, the arrangement in FIG. 3B is similar to the arrangement shown in FIG. 3A, except that the arrangement shown in FIG. 3B include a spacer, similar to the spacer 202 shown in FIG. 2B. In this arrangement as well, the entirety of the magnetic flux 308 of the second magnet 104 traverses at least a portion of the first magnet 102.

Figure 3C:
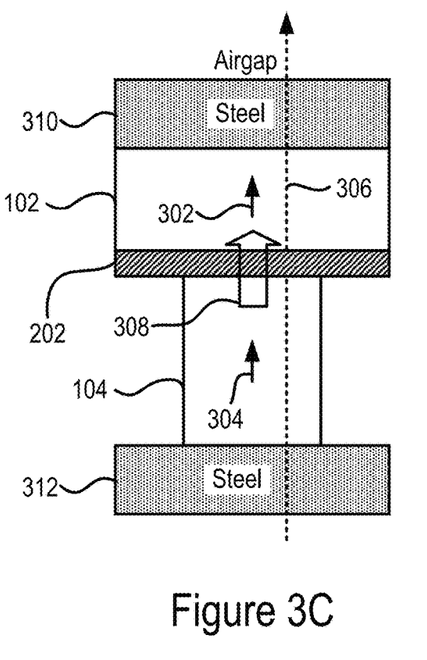

FIG. 3C shows another example arrangement of two magnets. In particular, the arrangement shown in FIG. 3C shows additional elements such as steel (310 and 312) and airgaps that typically form part of a magnetic circuit in an electrical machine such as, for example a motor or a generator. Specifically, a first steel element 310 is positioned adjacent the first magnet 102 and between the first magnet 102 and the airgap, while a second steel element 312 is positioned adjacent the second magnet 104. The steel elements 310 and 312 as well as the airgap form part of the magnetic circuit 306. In this arrangement as well, in the magnetic circuit 306 formed in part by the first magnet 102 and the second magnet 104 the entirety of the magnetic flux 308 of the second magnet 104 traverses the first magnet 102. While the arrangement shows steel elements, it is understood that other ferromagnetic materials could also form part of the magnetic circuit 306.

Figure 3D:
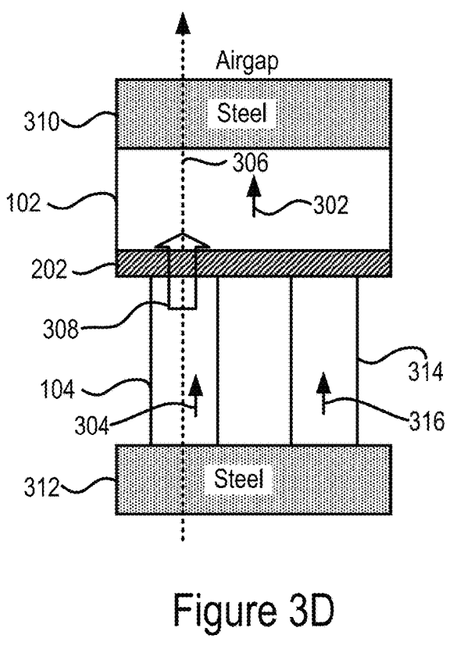

FIG. 3D shows an example arrangement of three magnets. In this arrangement, two magnets are in series with the first magnet 102. Specifically, the second magnet 104 and a third magnet 314 is each arranged in series with the first magnet 102. The third magnet 314 has a direction of magnetization 316 that is parallel to the direction of magnetization 304 of the second magnet 104. It should be noted that in this arrangement, the second magnet 104 is not in series with the third magnet 314, because the magnetic flux 308 of the second magnet 104 does not traverse the third magnet 314. However, the second magnet 104 is in series with the first magnet 102 because the entirety of the magnetic flux 308 of the second magnet 104 traverses the first magnet 102.

Figure 3E:
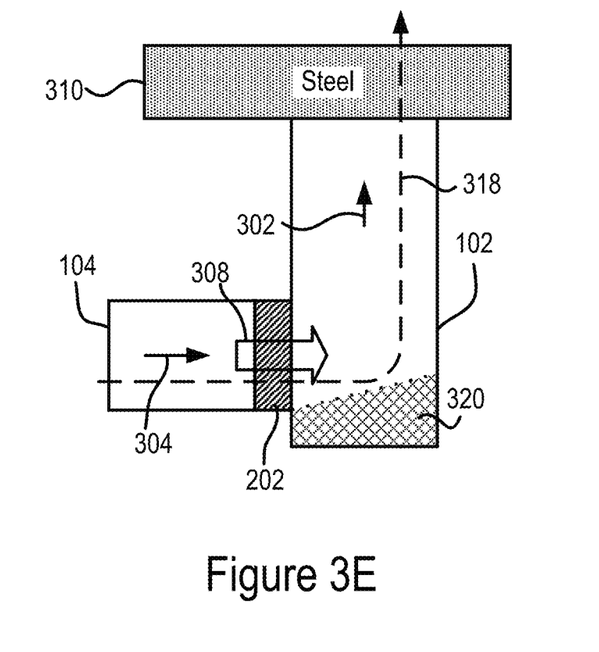

FIG. 3E shows yet another arrangement of two magnets. In this arrangement, the length of second magnet 104 is positioned perpendicular to the length of the first magnet 102. The first magnet 102 and the second magnet 104, in part, form a magnetic circuit 318. Within the magnetic circuit 318, the entirety of the magnetic flux 308 of the second magnet traverses at least a portion of the first magnet 102. A portion 320 of the first magnet 102 is not traversed by the magnetic flux 308 of the second magnet 104. However, as the entirety of the magnetic flux 308 traverses "at least a portion of the first magnet 102," the second magnet 104 can be considered to be in series with the first magnet 102.

Figure 3F:
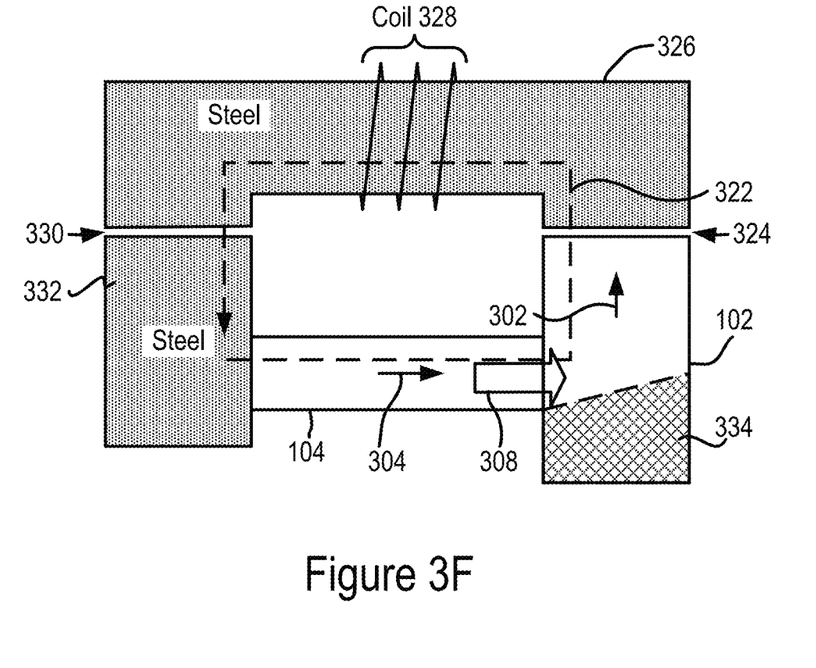

FIG. 3F shows yet another arrangement of two magnets. This arrangement is similar to the arrangement shown in FIG. 3E but includes a complete magnetic circuit 322. The arrangement includes the first magnet 102, a first airgap 324, a first steel core 326 around which coil 328 is wound, a second airgap 330, and a second steel core 332. The coil 328 can carry an electric current to magnetize the first steel core 326. The first airgap 324 is present between the first magnet and one end of the first steel core 326, and a second airgap 330 is present between a second end of the first steel core 326 and the second steel core 332. The arrangement shown in FIG. 3F can represent a portion of an electrical machine, where the first steel core 326 can represent a portion of the stator, while the combination of the second steel core 332, the first magnet 102 and the second magnet 104 can represent a portion of the rotor, with the first airgap 324 and the second airgap 330 allowing the rotor to move in relation to the stator. The first magnet 102 includes a portion 334 that is not traversed by the magnetic flux 308 of the second magnet 104. As in the arrangement shown in FIG. 3E, in the arrangement shown in FIG. 3F, the second magnet 104 is in series with the first magnet 102 as an entirety of the magnetic flux 308 of the second magnet 104 traverses at least a portion of the first magnet 102 in the magnetic circuit 322 formed in part by the first magnet 102 and the second magnet 104.

Figure 3G:
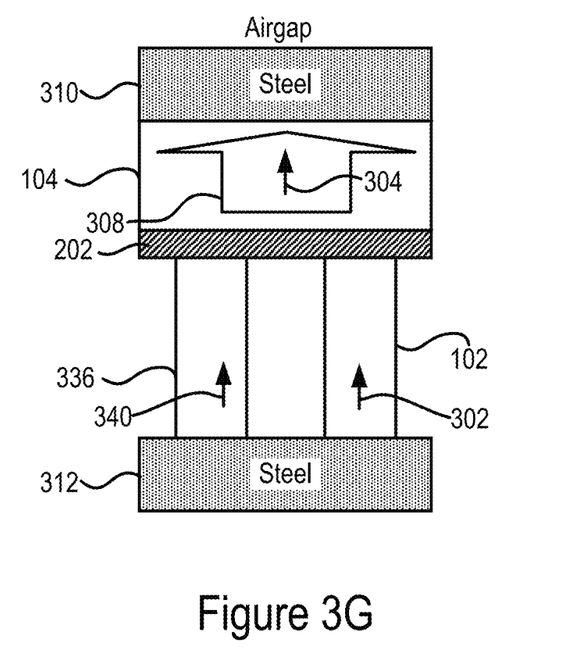
FIGS. 3G-3H show examples of magnet arrangements that are not considered to be in series.

FIG. 3G shows another arrangement in which two magnets are not in series.

In particular, the arrangement in FIG. 3G shows the second magnet 104 positioned adjacent to the first steel element 310 while the first magnet 102 is positioned adjacent the second steel element 312. A third magnet 336 is positioned in parallel with the first magnet 102 and has a direction of magnetization 340 that is parallel to that of the first magnet 102. The third magnet 336 can have characteristics similar to the second magnet 104, however that is not necessary. For example, the third magnet 336 can have the same coercivity and remanence values as the second magnet 104. In this arrangement, at least part of the second magnet 104 is not in series with the first magnet 102. This is because while the direction of magnetizations of both the magnets are the same, not the entirety of the magnetic flux 308 of the second magnet traverses the first magnet 102. Therefore, the second magnet 104 cannot be considered to be in series with the first magnet 102.

Figure 3H:
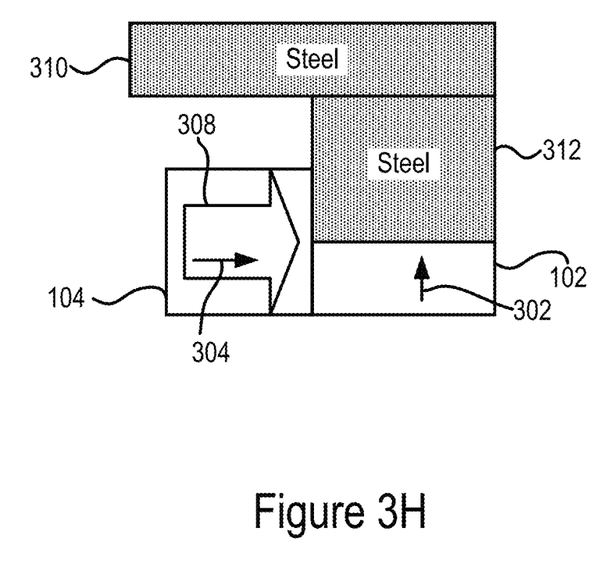

FIG. 3H shows another arrangement in which two magnets are not in series.

In this arrangement, at least a portion of the magnetic flux 308 of the second magnet 104 does not traverse the first magnet 102. Therefore, the second magnet 104 is not in series with the first magnet 102.

Turning to equation (1) presented above, the left-hand side of equation (1) is the ratio of the effective surface area $S_1$ of the first magnet 102 to the effective surface area $S_2$ of the second magnet 104. This ratio or the relative sizes of the magnets, can be a function of the relative remanences of the two magnets. Generally, the effective surface area of the magnet is the cross-sectional area of the magnet normal to the direction of magnetization of the magnet. In cases where the shape of the magnet is a cylinder or a rectangular cuboid (such as the first magnet 102 and the second magnet 104 discussed above in relation to FIGS. 3A-3F) where the direction of magnetization is along the longitudinal axis of the magnet, the effective cross-sectional area can be the actual cross-sectional area of the magnet. However, in instances where the direction of magnetization is not along the longitudinal axis or the shape of the magnet is such that the cross-sectional area is not uniform along the direction of magnetization, a cross-sectional area normal to the longitudinal axis is not representative of the effective cross-sectional area. In such instances, further consideration is needed to determine the effective cross-sectional area.

Figure 4A:
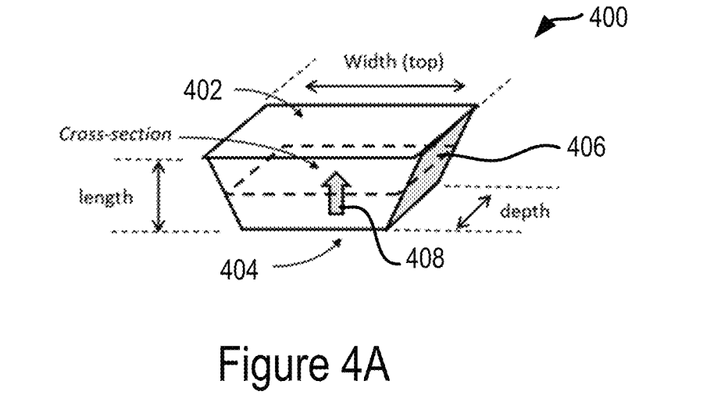
FIGS. 4A-4E show cross-sectional area determination of magnets of various shapes and orientations of directions of magnetization.

FIG. 4A shows a permanent magnet 400 with non-constant cross-sectional areas normal to the direction of magnetization. The magnet 400 includes a first surface 402, a second surface 404 opposing and parallel to the first surface 402 and a plurality of side surfaces 406 that extend between the perimeters of the first surface 402 and the second surface 404. The first surface 402 has a surface area that is larger than the surface area of the second surface 404. As a result, the plurality of side surfaces 406 have non-perpendicular angle with respect to both the first surface 402 and the second surface 404. In addition, the cross-sectional area of the magnet 400 is non-constant or non-equal along the length of the magnet 400. The magnet 400 has a direction of magnetization, indicated by arrow 408, and is substantially normal to the first surface 402 and the second surface 404. Given the shape of the magnet 400 with non-constant cross-sectional areas along the direction of magnetization, consideration needs to be given to which of the multitudes of cross-sectional areas should be selected as representative of the effective cross-sectional area. One factor that can impact the selection can be whether the magnet 400 is being used as the first magnet 102 or the second magnet 104. In other words, selection of the cross-sectional area can depend upon whether the magnet 400, which is positioned in series with another magnet, is the magnet with the higher coercivity or with the lower coercivity.

If the magnet 400 is the magnet with lower coercivity than that of the other magnet in series, then the effective cross-sectional area is equal to the largest of the non-constant cross-sectional areas. At least one reason to select the largest of the non-constant surface areas is that for the magnet with lower coercivity, the magnetic flux density would be lowest at the largest cross-sectional area, which is therefore the area where the magnet is most susceptible to demagnetization. Therefore, the effective surface area for the magnet with the lower coercivity is the cross-sectional surface area where the flux density is the lowest. For the magnet 400 shown in FIG. 4A, the cross-sectional area with the largest area is the area of the first surface 402.

If the magnet 400 is the magnet with the higher coercivity than that of the other magnet in series, then the effective cross-sectional area is equal to the smallest of the non-constant cross-sectional areas. Thus, if the magnet 400 were to be utilized as the first magnet 102, then the effective cross-sectional area would be the area of the second surface 404, which has the smallest cross-sectional area among all the non-constant cross-sectional areas.

It should be noted that only those portions of the magnet 400 that is within a magnetic circuit formed in part by the magnets in series should be considered in determining the cross-sectional area. For example, referring to FIG. 3F, the portion 334 of the first magnet 102 may not be considered in determining the effective cross-sectional area of the magnet. This ensures that only those portions of the magnet that carry the magnetic flux from the second magnet 104, and therefore affect the magnetic flux density of the magnet are included in determining the effective cross-sectional area in the manner discussed above.

Figure 4B:
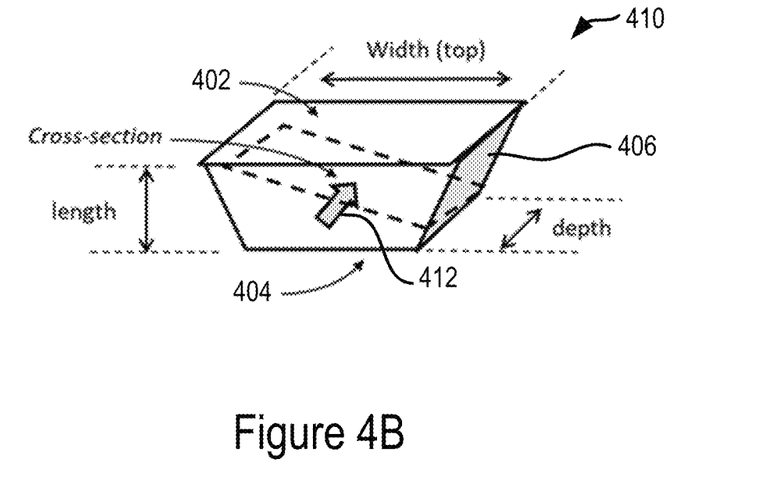

FIG. 4B shows another example permanent magnet 410 with non-constant cross-sectional areas normal to the direction of magnetization. The permanent magnet 410 is similar in shape to the permanent magnet 400 shown in FIG. 4A, however unlike the permanent magnet 400 in which the direction of magnetization, indicated by arrow 408, is substantially normal to the first surface 402 and the second surface 404, the direction of magnetization of the magnet 410, indicated by the arrow 412, is non-perpendicular to both the first surface 402 and the second surface 404. As a result, the cross-sectional areas are non-constant along the direction of the magnetization. One example cross-sectional area, indicated by broken lines, shows a cross-sectional area within the magnet that is an angle with respect to the first surface 402 and the second surface 404 but is normal to the direction of magnetization. Similar to the approach described in relation to FIG. 4A, the effective cross-sectional area for a magnet would depend upon whether the magnet 410 is being utilized in a series arrangement as the magnet with the higher coercivity or the magnet with the lower coercivity. If the magnet 410 is utilized as the magnet with the lower coercivity (e.g., the second magnet 104) then the effective cross-sectional area would be the largest cross-sectional area within the magnet 410 that is normal to the direction of magnetization indicated by the arrow 412. If the magnet 410 is utilized as the magnet with higher coercivity (e.g., the first magnet 102), then the effective cross-sectional area would be equal to the smallest cross-sectional area within the magnet 410 that is normal to the direction of magnetization.

Figure 4C:
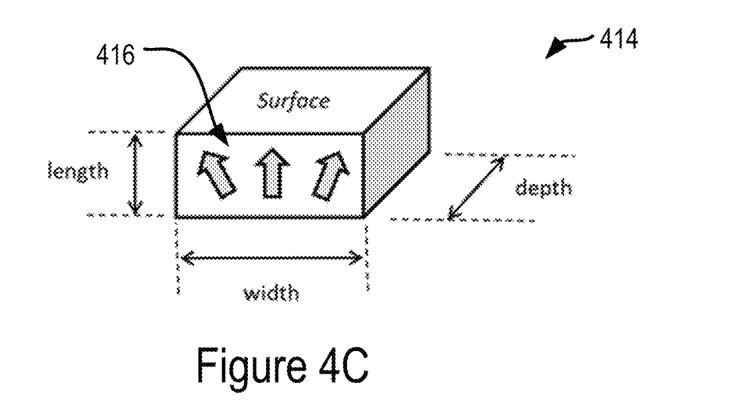

FIG. 4C shows another example permanent magnet 414 where the direction of magnetization is along multiple directions. In particular, arrows 416 show the directions of magnetization of the magnet 414. In such instances, the cross-sectional areas can be curved surfaces within the magnet 414 where the curved surfaces are shaped in a manner such that each direction of magnetization is normal to the curved surface. There can be a plurality of such curved surfaces along the length of the magnet 414. If the magnet 414, when arranged in series with another magnet, is the magnet with the lower coercivity (e.g., the second magnet 104), then the effective cross-sectional area of the magnet 414 would be the area of the largest of the plurality of curved surfaces. On the other hand, if the magnet 414 has the higher coercivity, then the effective cross-sectional area would be the area of the smallest of the plurality of curved surfaces within the magnet 414.

Figure 4D:
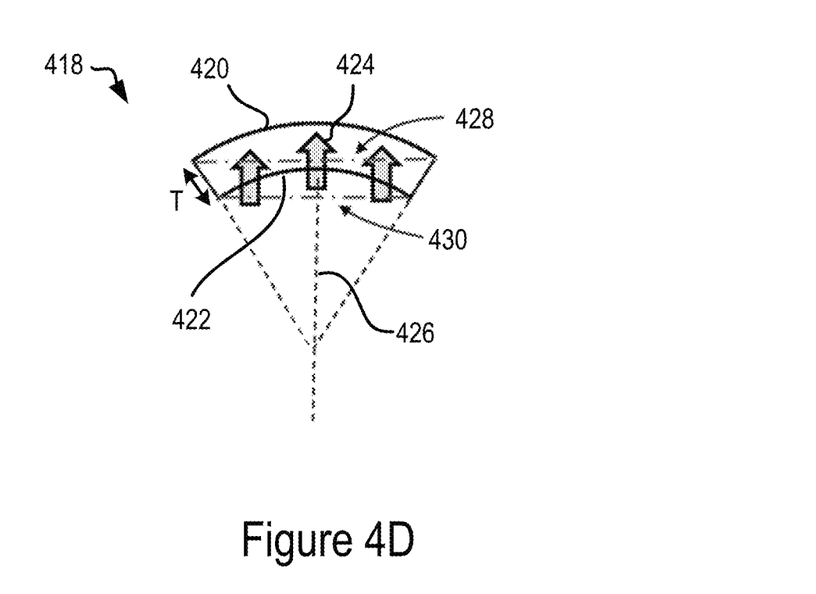

FIG. 4D shows yet another example of a permanent magnet where the magnet 418 has a curved shape. In particular, the magnet 418 has a curved shape defined by a first curved surface 420 and a second curved surface 422 separated by a thickness T of the magnet. The direction of magnetization indicated by the arrows 424 is parallel to one radius 426 of the curved shape of the magnet 418. The magnet 418 can have several cross-sectional planes that are normal to the direction of magnetization. If the magnet 418, when arranged in series with another magnet, is the magnet with lower coercivity (e.g., the second magnet 104), then the effective cross-sectional area of the magnet 418 would be the area of a first plane 428 having the largest area. On the other hand, if the magnet 418, when arranged in series with another magnet, is the magnet with higher coercivity (e.g., the first magnet 102), then the effective cross-sectional area of the magnet would be the area of the second plane 430 having the smallest area. It should be noted that the second plane 430 can lie outside of the shape of the magnet 418.

Figure 4E:
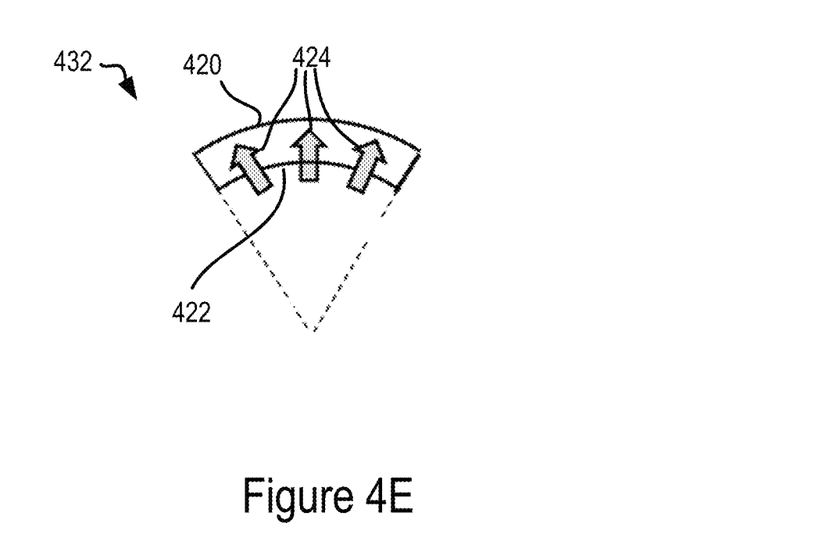

FIG. 4E shows yet another example of a permanent magnet where the magnet 432 has a curved shape. In this example, the direction of magnetization can have multiple directions, as indicated by the arrows 424. For example, the curved shape of the magnet 432 can have multiple radii extending from an imaginary center, and the directions of magnetization can extend along these radii. The magnet 432 can include multiple curved surfaces where for each curved surface each of the directions of magnetization is normal to the curved surface. If the magnet 432, when arranged in series with another magnet, is the magnet with lower coercivity (e.g., the second magnet 104), then the effective cross-sectional area of the magnet 432 would be the area of the largest of the multiple curved surfaces, which in this case is the first curved surface 420. On the other hand, if the magnet 432, when arranged in series with another magnet, is the magnet with higher coercivity (e.g., the first magnet 102), then the effective cross-sectional area of the magnet 432 would be the area of the smallest of the multiple curved surfaces, which in this case is the second curved surface 422.

It should be noted that the examples provided above are not limiting and are provided merely as examples for determining the cross-sectional area of magnets of different shapes. Cross-sectional areas of magnets with shapes different from the ones discussed above can be determined using approaches similar to those discussed above in relation to FIGS. 4A-4E.

Figure 5:
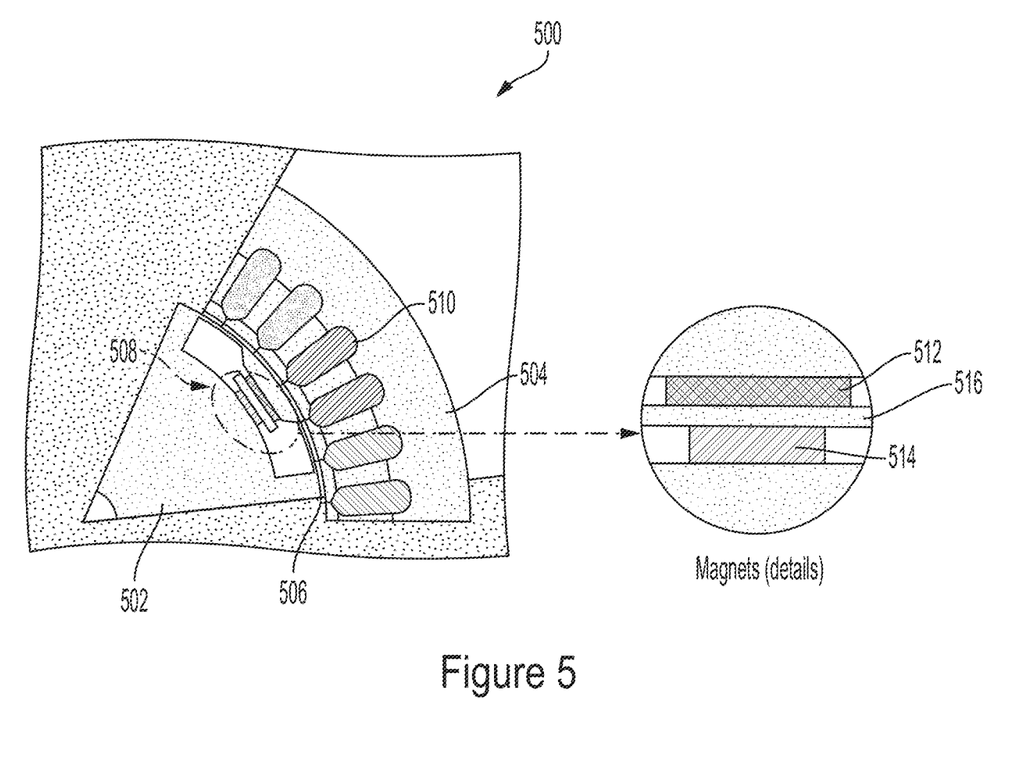
FIG. 5 shows a portion (one pole) of a cross-section of a permanent magnet motor.

The magnetic apparatuses discussed herein can be utilized in several applications. In one example, the magnetic apparatuses can be utilized in electric machines such as electric motors or electric generators. FIG. 5 shows a cut-out portion of a cross-section of a permanent magnet motor 500. The portion of motor 500 shown in FIG. 5 is, by way of example, one pole of machine 500, specifically one of two poles in a pole pair, with this exemplary machine having 3 pole pairs. In particular, the motor 500 includes a rotor 502 and a stator 504 separated by an airgap 506. The stator 504 includes one or more coil windings 510 that include current carrying conductors. The rotor 502 includes a magnetic apparatus 508. The magnetic apparatus 508 can include at least a first magnet 512, a second magnet 514, and a spacer 516 separating the first magnet 512 and the second magnet 514. The first magnet 512 and the second magnet 514 can be similar to the first magnet 102 and the second magnet 104 discussed above. In some instances, the magnetic apparatus 508 may not include the spacer 516. In some instances, additional poles may or may not include the series configuration of the magnetic apparatus 508 and could instead include magnets of only one type.

The magnetic apparatus 508 is arranged in a manner such that the first magnet 512 is positioned closer to the airgap 506 than the second magnet 514. This reduces the risk of the magnetic fields generated by the current carrying conductors in the coil windings 510 from demagnetizing the second magnet 514.

As discussed above, the series arrangement of the first magnet and the second magnet reduces the risk of demagnetization of the second magnet. As a result, the magnets can sustain higher magnetic field intensities. These magnetic fields are generated by the current carrying conductors in the one or more coil windings 510. Thus, these current carrying conductors can carry a relatively larger current than in instances where the poles incorporate only the second magnet. As the maximum torque generated by the motor 500 is a function of the magnitude of the current in the one or more coil windings 510, the larger current can correspond to a larger maximum torque provided by the motor 500.

While FIG. 5 shows the magnetic apparatus 508 positioned in the rotor 502, it is understood that the magnetic apparatus 508 can also be positioned in the stator 504 and the one or more coil windings 510 positioned in the rotor 502.

As discussed herein, the first magnet can be of high coercivity and can include magnet types such as, for example, neodymium-iron-boron type, samarium-cobalt type, and the like. As discussed herein, the second magnet can be of low coercivity in relation to the coercivity value of the first magnet, and can include magnet types such as, for example, iron nitride type. In some instances, iron nitride type magnets can include those described in WO/2020/237192 and in WO/2021/168438, each of which is incorporated herein by reference in its entirety.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An apparatus, comprising:
    a first magnet with a first remanence value and a first coercivity value, the first magnet having a first cross-sectional area substantially normal to a direction of magnetization of the first magnet;
    a second magnet positioned in series with the first magnet, the second magnet with a second remanence value and a second coercivity value that is less than the first coercivity value, the second magnet having a second cross-sectional area substantially normal to a direction of magnetization of the second magnet; and
    an electric machine including a stator and a rotor separated from the stator by a gap between the stator and the rotor;
    wherein the first magnet and the second magnet are positioned in series in only one of the stator or the rotor, and the first magnet is positioned closer to the gap than is the second magnet;
    wherein a ratio of the first cross-sectional area to the second cross-sectional area is equal to or greater than a ratio of the second remanence value to the first remanence value.

2. The apparatus of claim 1, wherein the second magnet is positioned in a path of the direction of magnetization of the first magnet.

3. The apparatus of claim 1, wherein the second remanence value is greater than the first remanence value.

4. The apparatus of claim 1, wherein an operating point of the second magnet on a second BH curve associated with the second magnet is located further away from a demagnetization point on the second BH curve than is an operating point of the first magnet on a first BH curve associated with the first magnet.

5. The apparatus of claim 1, wherein the first magnet has a shape that has non-constant cross-sectional areas normal to the direction of magnetization of the first magnet, wherein the first cross-sectional area is equal to a smallest of the non-constant cross-sectional areas.

6. The apparatus of claim 1, wherein the second magnet has a shape that has non-constant cross-sectional areas normal to the direction of magnetization of the second magnet, wherein the second cross-sectional area is equal to a largest of the non-constant cross-sectional areas.

7. The apparatus of claim 1, wherein the first magnet has a first curved shape defined by a first curved surface and a second curved surface separated by a thickness of the first magnet, wherein the direction of magnetization of the first magnet is parallel to one radius of the first curved shape, and wherein the first cross-sectional area includes an area of a first plane normal to the direction of magnetization of the first magnet.

8. The apparatus of claim 7, wherein the first plane normal to the direction of magnetization of the first magnet has a smallest area from among a set of planes that are normal to the direction of magnetization of the first magnet.

9. The apparatus of claim 1, wherein the first magnet has a first curved shape defined by a first curved surface and a second curved surface separated by a thickness of the first magnet, wherein the direction of magnetization of the first magnet has multiple directions that extend along the radii of the first curved shape, and wherein the first cross-sectional area includes an area of a curved surface that is normal to the multiple directions.

10. The apparatus of claim 9, wherein the curved surface normal to the multiple directions is a curved surface with a smallest area from among a set of curved surfaces that are normal to the multiple directions.

11. The apparatus of claim 1, wherein the second magnet has a second curved shape defined by a third curved surface and a fourth curved surface separated by a thickness of the second magnet, wherein the direction of magnetization of the second magnet is parallel to one radius of the second curved shape, and wherein the second cross-sectional area includes an area of a second plane normal to the direction of magnetization of the second magnet.

12. The apparatus of claim 11, wherein the second plane normal to the direction of magnetization of the second magnet has a largest area from among a set of planes that are normal to the direction of magnetization of the second magnet.

13. The apparatus of claim 1, wherein the second magnet has a second curved shape defined by a third curved surface and a fourth curved surface separated by a thickness of the second magnet, wherein the direction of magnetization of the second magnet has multiple directions that extend along the radii of the second curved shape, and wherein the second cross-sectional area includes an area of a curved surface that is normal to the multiple directions.

14. The apparatus of claim 13, wherein the curved surface normal to the multiple directions is a curved surface with a largest area from among a set of curved surfaces that are normal to the multiple directions.

15. The apparatus of claim 1, wherein the first magnet and the second magnet are separated by a spacer.

16. The apparatus of claim 15, wherein the spacer includes ferromagnetic material.

17. The apparatus of claim 15, wherein the spacer has a cross-sectional area that is at least as large as the greater of the first cross-sectional area and the second cross-sectional area.

18. The apparatus of claim 15, wherein a thickness of the spacer is less than or equal to 3 mm.

19. The apparatus of claim 1, wherein the electric machine comprises of a plurality of poles, wherein at least one pole of the plurality of poles includes the first magnet and the second magnet.

20. The apparatus of claim 1, wherein the first magnet is of neodymium-iron-boron type.

21. The apparatus of claim 1, wherein the first magnet is of samarium-cobalt type.

22. The apparatus of claim 1, wherein the second magnet includes at least one of iron nitride type.

23. The apparatus of claim 1, wherein the direction of magnetization of the first magnet and the direction of magnetization of the second magnet are both along a longitudinal axis extending through the first magnet and the second magnet, and the first cross-sectional area is greater than the second cross-sectional area.

24. The apparatus of claim 1, wherein the first cross-sectional area and the second cross-sectional area are both measured substantially parallel to the gap.

* * * * *